2,048,656

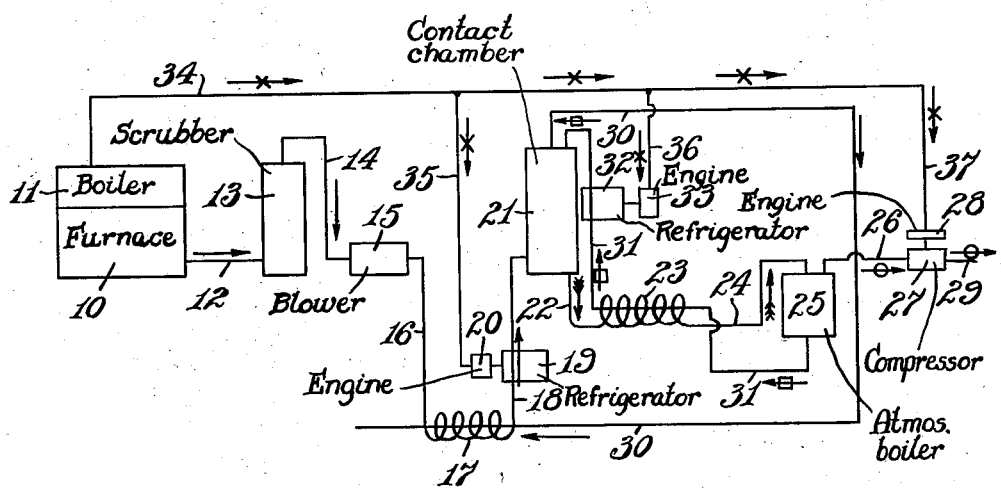
KEY
→ Flue gas
⇛ $CO_2$ Laden solvent
—⊖→ Pure $CO_2$
—✕→ Steam
—▭→ Lean solvent
Inventors
Franklin B. Hunt and
Robert L. Turner,
By Hood & Hahn
Attorneys Patented July 21, 1936

UNITED STATES PATENT OFFICE 2,048,656

METHOD OF AND APPARATUS FOR OBTAINING CARBON DIOXIDE

Franklin B. Hunt and Robert L. Turner, Chicago, Ill., assignors to The Liquid Carbonic Corporation, Chicago, Ill., a corporation of Delaware Application November 18, 1931, Serial No. 575,779

16 Claims. (Cl. 23—150)

The present application relates to a method of and apparatus for obtaining carbon dioxide, and more particularly to a method for obtaining carbon dioxide which may be carried out by novel apparatus of extremely high efficiency.

An object of the invention is to provide a method of and apparatus for obtaining carbon dioxide without the use of massive apparatus. A further object of the invention is to provide a method of obtaining carbon dioxide in which the absorption of carbon dioxide from a gaseous mixture, and the removal of the carbon dioxide from the absorbent medium are carried on at sub-zero temperatures. A further object of the invention is to provide a method of separating carbon dioxide from gaseous mixtures which involves the steps of absorbing the carbon dioxide in a liquid medium having substantially no absorptivity for the other gases in the mixture, and then boiling the carbon dioxide out of the absorbent medium, using only atmospheric heat to effect such separation. Further objects of the invention will appear as the description proceeds.

To the accomplishment of the above and related objects, my invention may be embodied in the form illustrated in the accompanying drawing, attention being called to the fact, however, that the drawing is illustrative only, and that change may be made in the specific construction illustrated and described, or in the specific steps stated, so long as the scope of the appended claims is not violated.

The single figure is a diagrammatic illustration of a plant constructed in accordance with the present invention.

As illustrated, the plant comprises a furnace or combustion chamber 10 with which is associated a boiler 11 for utilizing the heat of combustion. A conduit 12 is adapted to carry the gaseous products of combustion from the combustion chamber 10 to and through a scrubber 13 wherein the gaseous mixture is stripped of its solids. A conduit 14 conducts the scrubbed gases to a blower 15, whence the gases are forced through a pipe 16 to a coil 17. A conduit 18 leads from the coil 17 to a contact chamber 21. Preferably, a refrigerating mechanism 19 adapted to be driven by a steam engine 20, is associated with the conduit 18, said refrigerating mechanism being adapted to reduce the temperature of the gases in the conduit 18 to as low a temperature as is commercially practicable.

The contact chamber 21 contains a suitable liquid of a character having a high degree of solubility for carbon dioxide at low temperatures, the liquid medium having practically no solubility for the other components of the gaseous products of combustion. We have found that there are several substances having the requisite properties, some of these being ethyl alcohol, methyl alcohol, acetone, ether, ethyl acetate, and methyl acetate.

Of these, we now believe ethyl acetate to be the most satisfactory medium for use in the present process.

A conduit 22 leads from the contact chamber 21 to a coil 23, from which a conduit 24 leads to an atmospheric boiler 25. A conduit 26 is adapted to conduct gaseous carbon dioxide from the boiler 25 to a compressor 27 connected to be driven by a steam engine 28, a conduit 29 leading from the compressor 27 either to another compressor or compressors, or to a receptacle for carbon dioxide.

A conduit 30 extends from the contact chamber 21 and into heat interchanging relation with the coil 17.

A conduit 31 is connected to the chamber 21 and has associated therewith a refrigerating mechanism 32 adapted to be driven by a steam engine 33. The conduit 31 is likewise connected with the boiler 25, and the portion of the conduit 31 between the boiler 25 and the refrigerating mechanism 22 is arranged in heat interchanging relation with the coil 23.

A steam line 34 is connected to the boiler 11, and is provided with branches 35, 36, and 37 adapted, respectively, to supply steam to the engines 20, 33, and 28.

It is to be understood that, while we have indicated separate steam engines for driving the refrigerating mechanisms 19 and 32 and the compressor 27, all of these mechanisms might be driven by a single steam engine.

When operation of the system is to be initiated, a suitable supply of solvent is filled into the contact chamber 21 and the atmospheric boiler 25. The refrigerating mechanism 32 is then operated to reduce the temperature of the solvent to a value somewhere between −59° and −78° C. In some instances, it may be necessary to provide a circulating pump in the circulating system including the chamber 21 and the boiler 25.

After the temperature of the solvent in the chamber 21 has been reduced to a suitable value, the blower 15 and the refrigerating mechanism 19 are started, and flue gas from the furnace 10 is led through the scrubber 13 and the refrigerating mechanism 19 to the contact chamber 21.

At a temperature of −59° C., ethyl acetate will absorb approximately 89 volumes of carbon dioxide. At a temperature of —78° C., the same medium will absorb approximately 273 volumes of carbon dioxide. The solution of carbon dioxide in the solvent liquid is led through the conduit 22, the coil 23, and the conduit 24 to the boiler 25. The boiler 25 is not heat insulated, and atmospheric heat is permitted to raise the temperature of the solution in the boiler 25 to approximately —30° C., at which temperature only approximately 32 volumes of carbon dioxide will remain in the solution. The carbon dioxide driven out of the solution flows through the conduit 26 to the compressor 27, and thence through the conduit 29 either to further compressors or to a storage receptacle.

In the chamber 21, the temperature of the whole volume of gaseous mixture is, of course, reduced. The residual gases, not dissolved in the solvent medium, flow through the conduit 30 and, since a portion of said conduit 30 is associated with coil 17, the residual gases absorb heat from the gaseous mixture in the coil 17, thus reducing the temperature of said gaseous mixture. In practice, it will probably be necessary to operate the refrigerating mechanism 19 only a part of the time, in order to compensate for heat leakages.

The solvent medium from which substantially all of the carbon dioxide has been driven out in the boiler 25 flows, at a temperature of approximately —30° C., through the conduit 31. Since a portion of said conduit 31 adjacent the boiler 25 is arranged in heat interchanging relation with the coil 23 in which is contained a solution at a temperature ranging between —59° and —78° C., the solvent in the conduit 31 is cooled before it reaches the refrigerating mechanism 32, to a temperature ranging between —40° and —55 C. In the refrigerating mechanism 32, the temperature of the solvent in the conduit 31 is further reduced to a value ranging between —59° and —78° C.

It will thus be seen that, once the solvent has been brought to a working temperature, the refrigerating load upon the system consists merely of: (a) Cooling the pure carbon dioxide to effect liquefaction or solidification thereof, (b) offsetting imperfect heat interchange in the coils 17 and 23, and (c) offsetting heat leakage.

It will be noted that no means for effecting circulation of liquid between the chamber 21 and the boiler 25 is illustrated. As has been stated, the solvent used has an extremely high solubility for carbon dioxide, dissolving from 90 to 300 times its own volume of carbon dioxide, depending upon the temperature used. This fact permits the use of the air lift principle to effect circulation of the solvent, and is expected to eliminate entirely the necessity for expenditure of energy to effect the circulation of the solvent.

A still further advantage derived from the use of the present system lies in the fact that the solvents suggested are of such character that their solubility for carbon dioxide is substantially unaffected by the pressure of the carbon dioxide. For instance, at a temperature of —59° C., a pressure variation from 100 millimeters to 600 millimeters effects a variation in solubility of only five volumes. At a temperature of —78° C., a corresponding pressure variation effects a solubility variation of only eighteen volumes, this variation being approximately 6% at either temperature.

A still further advantage of the present system lies in the fact that the vapor pressures of the various solvents is very low at the working temperatures, so that the contamination of the carbon dioxide by vaporized solvent is exceeding slight. In the well known "lye process" of obtaining carbon dioxide, the vapor pressure of the water at the temperatures required to remove the carbon dioxide from the absorbent is relatively high, so that it is necessary to provide a condenser to separate the water vapor from the carbon dioxide.

Because of the extremely high solubility for carbon dioxide of the various solvents here under consideration, the volume of solvent required for the system is quite small. It thus becomes possible to use small size equipment. For instance, a plant producing approximately 1000 pounds of carbon dioxide per hour may use equipment of a size only large enough to accomodate a circulation of 10 to 15 gallons of ethyl acetate per minute, whereas a circulation of 200 to 300 gallons of lye solution would be required to handle the same amount of carbon dioxide.

The small size of the equipment required of course facilitates heat insulation of the equipment.

The energy required for circulating the solvent, even if the air lift principle be disregarded, is materially reduced because of the reduction in volume of the solvent medium.

Atmospheric heat is used in effecting separation of carbon dioxide from the solvent, so that none of the energy generated by the combustion of the fuel is required to accomplish this separation.

The system is of such character, and is so arranged, that the combustion of the fuel in the furnace 10 generates more energy than is required to separate the volume of carbon dioxide produced by such combustion from the other products of combustion, so that excess power is available for liquefaction or solidification of the carbon dioxide, or for other uses.

We claim as our invention:

1. The process of separating carbon dioxide from a gaseous mixture, which includes the steps of bringing the mixture into contact, under a pressure not exceeding atmospheric pressure, with a liquid solvent consisting of one of a group consisting of ethyl alcohol, methyl alcohol, acetone, ether, ethyl acetate, and methyl acetate, removing undissolved gases from contact with such liquid, and driving carbon dioxide out of solution in such liquid.

2. The process of separating carbon dioxide from a gaseous mixture, which consists in bringing the mixture into intimate contact at substantially atmospheric pressure with a liquid solvent consisting of one of a group consisting of ethyl alcohol, methyl alcohol, acetone, ether, ethyl acetate, and methyl acetate, whereby a portion of the carbon dioxide is dissolved in the solvent; removing the residual gases from contact with the solvent, and driving a portion of the dissolved carbon dioxide out of solution by heating, the solvent being continuously held at sub-zero temperatures.

3. The process of separating carbon dioxide from a gaseous mixture, which consists in bringing the mixture into intimate contact with a liquid solvent consisting of one of a group consisting of ethyl alcohol, methyl alcohol, acetone, ether, ethyl acetate, and methyl acetate, at a temperature lower than —59° C., and at substantially atmospheric pressure, whereby carbon dioxide is dissolved in the liquid while the other gases of the mixture are not dissolved, drawing off the residual gases, permitting the temperature of the solution to rise, under the influence of atmospheric heat, whereby a portion of the dissolved carbon dioxide is driven out of solution, and collecting the carbon dioxide so driven out of solution.

4. The process of separating carbon dioxide from a gaseous mixture which includes the steps of bringing the mixture into contact with acetone, removing undissolved gases from contact with the acetone, and driving carbon dioxide out of solution, by increasing the temperature of the solution.

5. The process of separating carbon dioxide from a gaseous mixture which includes the steps of bringing the mixture into contact with ether, removing undissolved gases from contact with the ether, and driving carbon dioxide out of solution, by increasing the temperature of the solution.

6. The process of separating carbon dioxide from a gaseous mixture which includes the steps of bringing the mixture into contact with ethyl acetate, removing undissolved gases from contact with the ethyl acetate, and driving carbon dioxide out of solution, by increasing the temperature of the solution.

7. The process of separating carbon dioxide from a gaseous mixture which consists in bringing the mixture into intimate contact with acetone, whereby a portion of the carbon dioxide is dissolved in the acetone, removing the residual gases from contact with the acetone, and driving a portion of the dissolved carbon dioxide out of solution by heating, the acetone being continuously held at sub-zero temperature.

8. The process of separating carbon dioxide from a gaseous mixture which consists in bringing the mixture into intimate contact with ether, whereby a portion of the carbon dioxide is dissolved in the ether, removing the residual gases from contact with the ether, and driving a portion of the dissolved carbon dioxide out of solution by heating, the ether being continuously held at sub-zero temperature.

9. The process of separating carbon dioxide from a gaseous mixture which consists in bringing the mixture into intimate contact with ethyl acetate, whereby a portion of the carbon dioxide is dissolved in the ethyl acetate, removing the residual gases from contact with the ethyl acetate, and driving a portion of the dissolved carbon dioxide out of solution by heating, the ethyl acetate being continuously held at sub-zero temperature.

10. The process of separating carbon dioxide from a gaseous mixture which consists in bringing the mixture into intimate contact with acetone at a temperature lower than minus 59 degrees C., whereby carbon dioxide is dissolved in the acetone while the other gases of the mixture are not dissolved, drawing off the residual gases, permitting the temperature of the solution to rise, under the influence of atmospheric heat, whereby a portion of the dissolved carbon dioxide is driven out of solution, and collecting the carbon dioxide so driven out of solution.

11. The process of separating carbon dioxide from a gaseous mixture which consists in bringing the mixture into intimate contact with ether at a temperature lower than minus 59 degrees C., whereby carbon dioxide is dissolved in the ether while the other gases of the mixture are not dissolved, drawing off the residual gases, permitting the temperature of the solution to rise, under the influence of atmospheric heat, whereby a portion of the dissolved carbon dioxide is driven out of solution and collecting the carbon dioxide so driven out of solution.

12. The process of separating carbon dioxide from a gaseous mixture which consists in bringing the mixture into intimate contact with ethyl acetate at a temperature lower than minus 59 degrees C., whereby carbon dioxide is dissolved in the ethyl acetate while the other gases of the mixture are not dissolved, drawing off the residual gases, permitting the temperature of the solution to rise, under the influence of atmospheric heat, whereby a portion of the dissolved carbon dioxide is driven out of solution, and collecting the carbon dioxide so driven out of solution.

13. Apparatus for separating carbon dioxide from gaseous mixtures, comprising a source of gaseous mixture containing carbon dioxide, a contact chamber, a boiler, said chamber and said boiler containing a liquid solvent for carbon dioxide, a conduit connecting said source with said chamber, a second conduit connecting said chamber with said boiler, a third conduit connecting said boiler with said chamber, and a fourth conduit leading from said chamber, portions of said second and third conduits being arranged in heat-exchanging relation with each other, and portions of said first and fourth conduits being arranged in heat-exchanging relation with each other.

14. Apparatus for separating carbon dioxide from gaseous mixtures, comprising a source of gaseous mixture containing carbon dioxide, a contact chamber, a boiler, said chamber and said boiler containing a liquid solvent for carbon dioxide, a conduit connecting said source with said chamber, a second conduit connecting said chamber with said boiler, a third conduit connecting said boiler with said chamber, a fourth conduit leading from said chamber, refrigerating means associated with said first conduit, and refrigerating means associated with said third conduit, a portion of said second conduit being arranged in heat-exchanging relation with a portion of said third conduit between said boiler and said refrigerating means associated with said third conduit, and a portion of said fourth conduit being arranged in heat-exchanging relation with a portion of said first conduit between said source and said refrigerating means associated with said first conduit.

15. Apparatus for obtaining carbon dioxide, comprising a fuel combustion chamber, a steam boiler associated with said combustion chamber, a contact chamber, an atmospheric boiler, said contact chamber and atmospheric boiler containing a solvent for carbon dioxide liquid at sub-zero temperatures, a conduit for conducting products of combustion from said combustion chamber to said contact chamber, a second conduit for conducting solvent from said atmospheric boiler to said contact chamber, refrigerating mechanism associated with said second conduit and adapted to reduce the temperature of fluid in said second conduit to sub-atmospheric values, means operable by steam generated in said first-named boiler for driving said refrigerating mechanism, a conduit for conducting solution from said contact chamber to said atmospheric boiler, and a conduit for conducting carbon dioxide from said atmospheric boiler.

16. Apparatus for obtaining carbon dioxide, comprising a fuel combustion chamber, a steam boiler associated with said combustion chamber, a contact chamber, an atmospheric boiler, said contact chamber and atmospheric boiler containing a solvent for carbon dioxide liquid at sub-zero temperatures, a conduit for conducting products of combustion from said combustion chamber to said contact chamber, a second conduit for conducting solvent from said atmospheric boiler to said contact chamber, refrigerating mechanism associated with said second conduit and adapted to reduce the temperature of fluid in said second conduit to sub-atmospheric values, means operable by steam generated in said first-named boiler for driving said refrigerating mechanism, a conduit for conducting solution from said contact chamber to said atmospheric boiler, a compressor connected to said atmospheric boiler and adapted to receive the liberated carbon dioxide therefrom, and means operable by steam generated in said first-named boiler for driving said compressor.

FRANKLIN B. HUNT.
ROBERT L. TURNER.